(12) United States Patent
Wu et al.

(10) Patent No.: US 10,938,516 B1
(45) Date of Patent: Mar. 2, 2021

(54) SYSTEMS AND METHODS FOR ETHERNET PACKET ERROR DETECTION AND CORRECTION IN AUTOMOTIVE ENVIRONMENTS

(71) Applicant: Marvell International Ltd., Hamilton (BM)

(72) Inventors: Dance Wu, Palo Alto, CA (US); Ying Zhou, Shanghai (CN); Zhiqiang Li, Shanghai (CN); Badruddin N. Lakhat, San Jose, CA (US); Hon Wai Fung, Fremont, CA (US); Jinsheng Li, Shanghai (CN); Yao Fu, Shanghai (CN)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/175,122

(22) Filed: Oct. 30, 2018

Related U.S. Application Data (60) Provisional application No. 62/614,293, filed on Jan. 5, 2018.

(51) Int. Cl.
| | |
|---|---|
| *H04L 1/18* | (2006.01) |
| *G08C 25/02* | (2006.01) |
| *H04L 1/08* | (2006.01) |
| *H04L 12/721* | (2013.01) |
| *H04L 1/00* | (2006.01) |

(Continued)

(52) U.S. Cl.
CPC ............. *H04L 1/08* (2013.01); *H04L 1/0061* (2013.01); *H04L 45/28* (2013.01); *H04L 45/66* (2013.01); *H04L 69/22* (2013.01)

(58) Field of Classification Search
CPC . H04L 1/08; H04L 45/66; H04L 45/28; H04L 1/0061; H04L 69/22; H04L 1/16; H04L 1/18; H04L 12/26; H04L 12/56
USPC .......................................................... 714/748
See application file for complete search history.

(56) References Cited

U.S. PATENT DOCUMENTS

| | | | | |
|---|---|---|---|---|
| 4,587,652 | A * | 5/1986 | Goldman | H04J 3/1682 370/252 |
| 2005/0078683 | A1* | 4/2005 | Page | H04L 5/16 370/395.5 |

(Continued)

FOREIGN PATENT DOCUMENTS

| | | | | |
|---|---|---|---|---|
| CN | 105119691 A | * | 12/2015 | |
| EP | 1944902 B1 | * | 11/2012 | ........... H04L 1/0009 |

*Primary Examiner* — Albert Decady
*Assistant Examiner* — Enamul M Kabir (57) ABSTRACT

Systems and methods for packet re-transmission via a bi-directional wired interface between two devices are provided. A transmitter of a first device transmits one or more first transmit data packets to a second device over the bi-directional wired interface. Concurrently with the transmission of the one or more first transmit data packets, the first device receives, over the bi-directional wired interface, one or more second received data packets from the second device. A packet integrity monitor of the first device monitors whether one or more received data packets of the second received data packets is corrupted at the physical layer of the first device. In response to detecting that one or more received data packets of the second received data packets is corrupted, the first device re-transmits one or more transmit data packets of the first transmit data packets that was previously transmitted over the bi-directional wired interface.

24 Claims, 3 Drawing Sheets

(51) Int. Cl.
*H04L 29/06* (2006.01)
*H04L 12/703* (2013.01)

(56) References Cited

U.S. PATENT DOCUMENTS

| | | | |
|---|---|---|---|
| 2006/0153155 A1* | 7/2006 | Jacobsen | H04L 1/1829 370/338 |
| 2008/0165838 A1* | 7/2008 | Vanderhaegen | H04L 1/0009 375/224 |
| 2014/0064267 A1* | 3/2014 | Thi | H04M 7/0087 370/352 |
| 2015/0222533 A1* | 8/2015 | Birrittella | H04L 45/66 370/392 |
| 2017/0099223 A1* | 4/2017 | Bruckner | H04L 49/206 |
| 2018/0062793 A1* | 3/2018 | Ueno | H04L 1/08 |

* cited by examiner

SYSTEMS AND METHODS FOR ETHERNET PACKET ERROR DETECTION AND CORRECTION IN AUTOMOTIVE ENVIRONMENTS

CROSS-REFERENCE TO RELATED APPLICATION

This application claims the benefit under 35 U.S.C. § 119(e) of U.S. Provisional Patent Application No. 62/614,293, filed Jan. 5, 2018, which is hereby incorporated by reference herein in its entirety.

FIELD OF USE

This disclosure relates to managing the transfer of packets between two components, and more particularly, to packet error detection and correction with extreme low latency over a wired Ethernet connection in an automotive environment.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Modern automobiles have different electrical components, among which components' electrical data such as control commands is transmitted in a digital form. The data, may for example, be digitized measurement values acquired by sensors, or may represent control data suitable for semi-automated or fully automated driving functions, or for engine management. Ethernet connections have become prevalent in an automotive environment for the transfer of the digital data between the different electrical components.

As bit errors are relatively uncommon in traditional wired networks, existing Ethernet protocols do not necessarily provide flow control or automatic repeat request (ARQ). Consequently, Ethernet packets having corrupted bits are detected and dropped without requesting a re-transmission of the corrupted packet at the physical layer. Instead, re-transmissions are managed by higher layer protocols which introduces additional latencies in transmission of packets over the wired connection. However, in the connected automotive environment, a comparatively high electromagnetic compatibility may cause more bit errors relative to non-automotive environment. Consequently, bit error management that is performed solely at an upper layer can be inefficient and impair the data performance in automotive Ethernet.

SUMMARY

Embodiments described herein provide for packet re-transmission via a bi-directional wired interface between two devices. In some embodiments, a transmitter of a first device transmits one or more first transmit data packets to a second device over the bi-directional wired interface. Concurrently with the transmission of the one or more first transmit data packets, the first device receives, over the bi-directional wired interface, one or more second received data packets from the second device. A packet integrity monitor of the first device monitors whether one or more received data packets of the second received data packets is corrupted. In response to detecting that one or more received data packets of the second received data packets is corrupted, the first device re-transmits one or more transmit data packets of the first transmit data packets that was previously transmitted over the bi-directional wired interface.

In some embodiments, the packet integrity monitor is disposed to detect whether the one or more received data packets is corrupted at a physical layer of the first device, without engaging a higher network layer to detect whether the one or more received data packets is corrupted.

In some embodiments, detecting whether one or more received data packets of the second received data packets is corrupted includes inspecting the second received data packets to detect whether one or more received data packets of the second received data packets has corrupted bits, and in response to detecting that one or more received data packets of the second received data packets has corrupted bits, re-transmitting one or more transmit data packets of the first transmit data packets that was previously transmitted over the bi-directional wired interface.

In some embodiments, inspecting the second received data packets received at the receiver to detect whether one or more received data packets of the second received data packets has corrupted bits includes calculating a checksum of respective data packets among the second received data packets received at the receiver and further includes, in response to detecting a checksum error in one or more received data packets of the second received data packets, determining that the one or more received data packets of the second received data packets has corrupted bits.

In some embodiments, the first device, in response to detecting that one or more received data packets of the second received data packets has corrupted bits, determines the existence of transient noise along the bi-directional wired interface.

In some embodiments, the first device estimates a duration of the transient noise existing along the bi-directional wired interface, determines a subset of the first transmit data packets previously transmitted affected by the transient noise, and re-transmits, over the bi-directional wired interface, the determined previously transmitted subset of the first transmit data packets to the second device.

In some embodiments, inspecting the second received data packets to detect whether one or more received data packets of the second received data packets has corrupted bits includes monitoring a sequence number associated with respective ones of the one or more second received data packets, and in response to determining that the one or more second received data packets include a discontinuity, determining that one or more received data packets of the second received data packets have been dropped.

In some embodiments, the first device determines that one or more second received data packets received over the bi-directional wired interface have corrupted bits and in response to making the determination, simultaneously re-transmits one or more first transmit data packets over the bi-directional wired interface.

In some embodiments, the first devices generates one or more idle data packets to be transmitted as the one or more first transmit data packets over the bi-directional wired interface and inserts a sequence number to a preamble of each of the one or more first transmit data packets.

In some implementations, a network device for packet re-transmission via a bi-directional wired interface between two devices includes a transmitter, a receiver, a packet integrity matter, and a processing circuitry. The transmitter is configured to transmit, over the bi-directional wired interface, one or more first transmit data packets to a second device. The receiver is configured to receive, concurrently with the transmission of the one or more first transmit data packets, over the bi-directional wired interface, one or more second received data packets from the second device. The packet integrity monitor detects whether one or more received data packets of the second received data packets is corrupted. The processing circuitry, in response to detecting that one or more received data packets of the second received data packets is corrupted, causes the transmitter to re-transmit one or more transmit data packets of the first transmit data packets that was previously transmitted over the bi-directional wired interface.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure generally relates to improving packet error detection and correction in an automotive environment. More specifically, in embodiments described below, a packet error is detected on a physical level of an Ethernet connection, and subsequently non-corrupt replacement packets are sent with very low latency over the wired Ethernet connection. The disclosed techniques are particularly suitable for use for automotive, industrial, and other environments exhibiting relatively high electromagnetic noise.

Existing Ethernet protocols usually require higher layer protocols (e.g., an application layer or upper sublayers of a data link layer providing flow control and ARQ) to manage the re-transmission of packets having corrupted bits. However, the handshaking required in higher layer transmission protocols such as Transmission Control Protocol (TCP) adds additional overhead latencies and may reduce the valid data throughput. Specifically, in an automotive environment, where transmission latency could impair the performance of the automobile, a more efficient re-transmission mechanism is much needed.

The methods and systems described below for packet re-transmission via a bi-directional wired interface between two devices, e.g., two components within an automobile, address this issue. The duplex nature of an Ethernet connection is utilized for performing error detection and correction closer to physical layer to achieve very low latency and low impact to data throughput.

For example, when an error is detected (e.g., checksum error or packet drop) on one direction of the bi-directional Ethernet connection at the physical layer of the network device, the network device determines that the transmission media is not reliable, and thus assumes that packets transmitted in both directions of the bi-directional Ethernet connection will have errors. In response, the network device automatically starts a re-transmit mechanism for the other direction of the bi-directional Ethernet connection at the physical layer without requiring input from the traditional high-layer re-transmit protocol, to ensure low latency. As a result, packet corruption can be detected based on evaluation of bits of the received packets (e.g., by calculation of a checksum), and is corrected without requiring engagement of higher layer protocols to evaluate the received packets.

Figure 1:
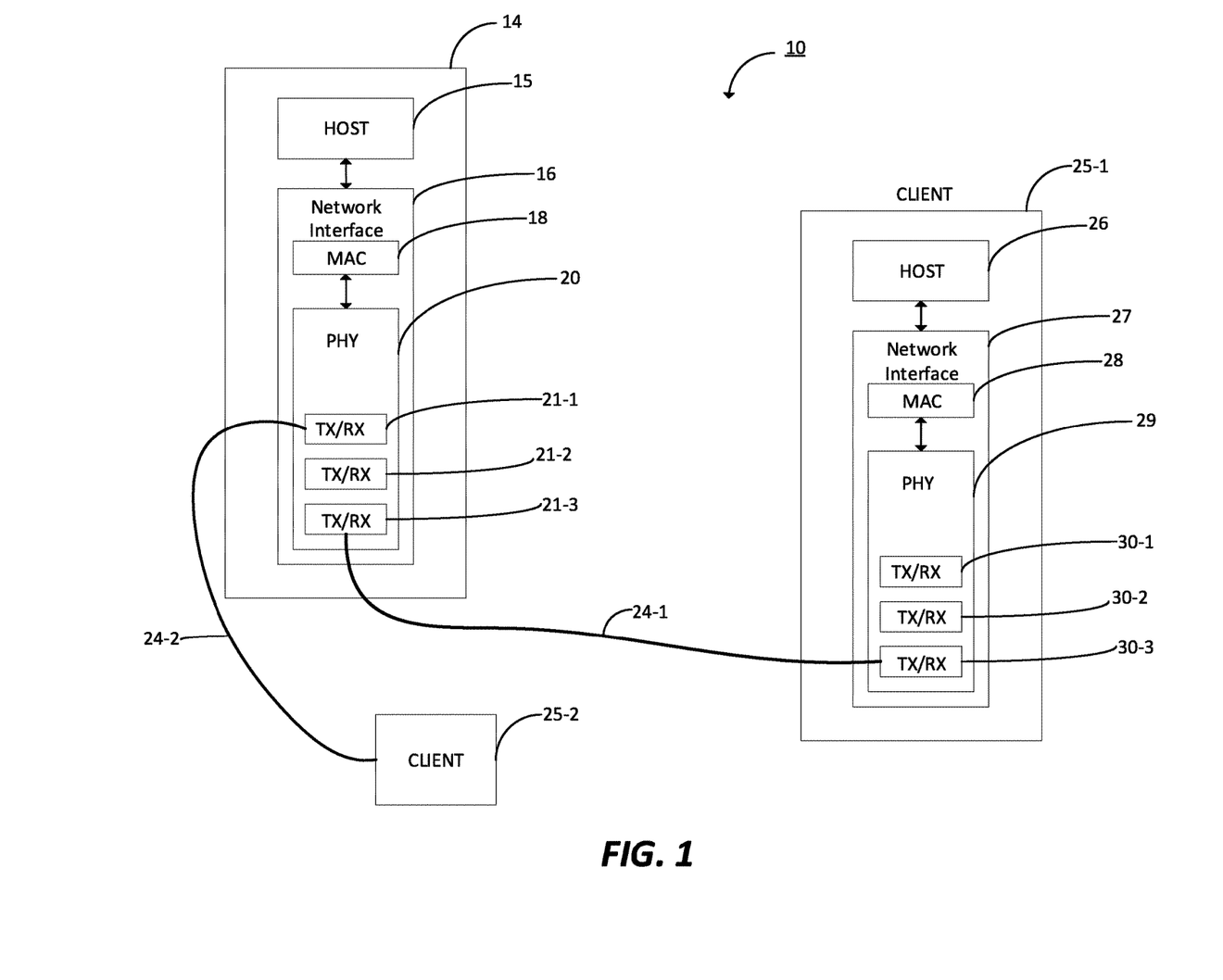
FIG. 1 is a block diagram illustrating an example of a wired communication system according to some embodiments described herein.

FIG. 1 is a block diagram illustrating an example of a communication system, such as an automotive system 10 which is suitable for use in an automotive, industrial, or other electro-magnetically noisy environment, according to some embodiments described herein. Although the present devices and techniques are described in the context of an example for automotive Ethernet, it will be understood that the devices and techniques described below are also suitable for other industrial and electro-magnetically noisy applications. Moreover, although an automotive Ethernet is provided as a specific example, the present disclosure is not limited to only an automotive Ethernet environment.

The automotive system 10 includes different electrical components (e.g., network device 14 and multiple clients 25-1 and 25-2 (collectively clients 25), among which electrical data such as control commands is transmitted in a digital form. The communication between the network device 14 and client 25 will be further described in detail with reference to FIG. 2.

The network device 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21-1, 21-2, 21-3 (collectively, transceivers 21). Although three transceivers 21 are illustrated in FIG. 1, the network device 14 includes other suitable numbers (1, 2, 3, 4, 5, etc.) of transceivers 21 in other embodiments.

The automotive system 10 includes a plurality of client stations 25. Although two client stations 25 are illustrated in FIG. 1, the automotive system 10 includes other suitable numbers (1, 2, 3, 4, 5, etc.) of client stations 25 in various scenarios and embodiments. For example, any suitable number of electrical components within an automobile are included within the automotive system 10.

The client stations 25-1 includes a host processor 26 coupled to a network interface device 27. The network interface device 27 includes a MAC processing unit 28 and a PHY processing unit 29. The PHY processing unit 29 includes a plurality of transceivers 30-1, 30-2, and 30-3 (collectively, transceivers 30). Although three transceivers 30 are illustrated in FIG. 1, the client station 25-1 includes other suitable numbers (1, 2, 3, 4, 5, etc.) of transceivers 30 in other embodiments.

In some embodiments, the PHY processing unit 20 of the network device 14 is configured to generate data units conforming to a communications protocol and having formats that correspond to the respective protocol. For example, the data units include a preamble that includes a short training field (STF) in a beginning part of the preamble. The PHY processing unit 20 of the network device 14 can use a known, periodic reference sequence (also known as pilot or training sequence) as the STF sequence of the data units. The transceiver(s) 21 is/are configured to transmit the generated data units via the wired connection(s) 24. Similarly, the transceiver(s) 21 is/are configured to receive the data units via the wired connection(s) 24. The PHY processing unit of the network device 14 is configured to process received data units conforming to the communication protocol and having corresponding formats, according to various embodiments.

In some embodiments, the PHY processing unit 29 of the client device 25-1 is configured to generate data units conforming to the communication protocol and having corresponding formats. For example, the data units include a preamble that includes an STF in the beginning part of the preamble. The PHY processing unit 29 of the client device 25-1 can use a known, periodic reference sequence as the STF sequence of the data units. The transceiver(s) 30 is/are configured to transmit the generated data units via the wired connection(s) 24. Similarly, the transceiver(s) 30 is/are configured to receive data units via the wired connection(s) 24. The PHY processing unit 29 of the client device 25-1 is configured to process received data units conforming to the communication protocol and having corresponding formats, according to various embodiments.

Figure 2:
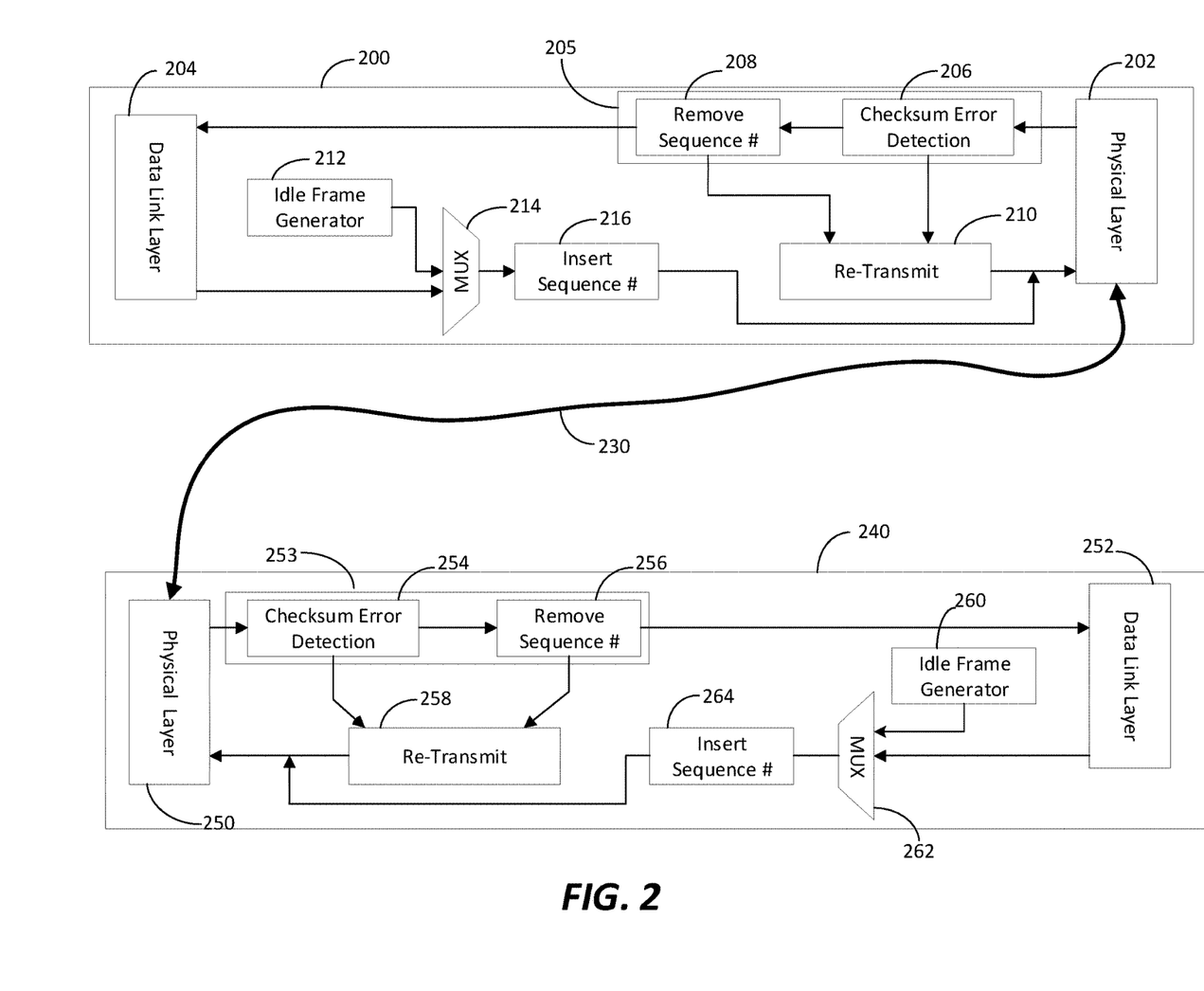
FIG. 2 is a system diagram illustrating an example of a wired communication system according to some embodiments described herein.

FIG. 2 provides a block diagram illustrating an error detection and retransmission mechanism over a wired connection between two network devices, which can be any device described in FIG. 1, according to some embodiments described herein.

A first network device 200 in accordance with embodiments described herein includes a physical layer (PHY) processing unit 202 and a medium access control (MAC) processing unit 204. In the example device seen, the PHY processing unit 202 includes one or more transceivers such as transceivers 21-1, 21-2, 21-3 described above with reference to FIG. 1. A second network device 240 in accordance with embodiments described herein also includes a PHY processing unit 250 and a MAC processing unit 252. The example PHY processing unit 250 includes one or more transceivers such as transceivers 30-1, 30-2, 30-3 described above with reference to FIG. 1.

As illustrated in FIG. 2, the first network device 200 and the second network device 240 are coupled over a bi-directional wired interface 230. In some embodiments, the bi-directional wired interface 230 between the two devices comprises a single twisted pair of wires in a full duplex mode of communication.

The first network device 200 further includes a packet integrity monitor 205 consisting of a checksum error detection circuit 206 and a sequence number removal circuit 208. Similarly, the second network device 240 includes a packet integrity monitor 253 including a checksum error detection circuit 254 and a Sequence number removal circuit 256.

The first network device 200 is configured to transmit, via a transmitter such as transceiver 21, over the bi-directional wired interface 230, one or more first transmit data packets to the second network device 240. At the same time, the first network device 200 receives, via a receiver such as transceiver 21, concurrently with the transmission of the one or more first transmit data packets, over the bi-directional wired interface 230, one or more second receive data packets from the second network device 240.

The second network device 240 is configured to transmit, via a transmitter such as transceiver 30, over the bi-directional wired interface 230, one or more second receive data packets to the first network device 200. At the same time, the second network device 240 receives, via a receiver such as transceiver 30, concurrently with the transmission of the one or more second receive data packets, over the bi-directional wired interface 230, one or more first transmit data packets from the first network device 200.

At the first network device 200, the packet integrity monitor 205 is configured to inspect the bits of the one or more second receive data packets. Simultaneously, the packet integrity monitor 253 of the second network device 240 is configured to inspect the bits of the one or more first transmit data packets received at the transceiver 30 over the bi-directional wired interface 230.

The checksum error detection circuit 206 of the packet integrity monitor 205 is configured to inspect the bits of each of the one or more second receive data packets to calculate the checksum of every received packet. When a checksum error is detected, the checksum error detection circuit 206 notifies a re-transmit module 210, implemented via processing circuitry, of the presence of the checksum error.

In some implementations, the sequence number removal circuit 208 of the packet integrity monitor 205 is configured to remove a sequence number of each of the second receive data packets received at the receiver of the first network device 200. More specifically, the sequence number removal circuit 208 is configured to drop one or more of second receive data packets having a repetition of a sequence number and notifies the re-transmit module 210 if a discontinuous sequence is found. It will be understood by those skilled in the art that a "discontinuous sequence" includes a repetition of a packet sequence number and/or a missing packet sequence number. When the sequence number removal circuit 208 of the packet integrity monitor 205 determines that the packet sequence numbers associated with the one or more received data packets are repeated, the previously received data packet with the repeated sequence number is dropped. When the sequence number removal circuit 208 of the packet integrity monitor 205 determines that the packet sequence numbers associated with the one or more received data packets are missing, the previously transmitted data packet is re-transmitted by the re-transmit module 210.

The re-transmit module 210, in response to receiving the notification from the checksum error detection circuit 206 and/or the sequence number removal circuit 208, determines that the communication path is corrupted due to transient noise, and as a result the one or more first transmit data packets previously transmitted over the bi-directional wired interface 230 also includes corrupted bits. The re-transmit module 210 maintains in a memory previously transmitted one or more first transmit data packets in the event that they need to be re-transmitted. Specifically, when the re-transmit module 210 receives a notification from the checksum error detection circuit 206 and/or the sequence number removal circuit 208, the re-transmit module 210 is configured to reset a memory read pointer and begins sending those one or more first transmit data packets that have previously been transmitted but had corrupted bits or had been dropped. Therefore, the re-transmit module 210 re-transmits the one or more first transmit data packets previously transmitted over the bi-directional wired interface 230.

When the re-transmit module 210 receives a notification from the checksum error detection circuit 206, a duration of the transient noise is determined. There are multiple ways to determine the duration of the transient noise on the bi-directional wired interface 230. For example, in one implementation, the re-transmit module 210 continues to transmit the same first transmit data packet repeatedly until the first network device 200 receives a second receive data packet with the correct checksum. However, when the re-transmit module 210 receives a notification from the sequence number removal circuit 208, the re-transmit module 210 re-transmits all the previously transmitted one or more first transmit stored in the memory of the re-transmit module 210.

In some implementations, the re-transmit module 210 is configured to estimate a duration of the transient noise existing along the bi-directional wired interface 230. For example, in an implementation, the re-transmit module 210 identifies a subset of the second receive data packets that has corrupted bits and determines a duration over which the subset of the second receive data packets having corrupted bits were received as the duration of transient noise. The re-transmit module 210 further determines a subset of the first transmit data packets previously transmitted during the duration of transient noise and re-transmit, over the bi-directional wired interface, the previously transmitted subset of first transmit data packets.

The second network device 240, via its receiver 30, in turn receives the re-transmitted subset of first transmit data packets. Concurrently, at the second network device 240, the packet integrity monitor 253 inspects the bits of the one or more first transmit data packets received by the second network device 240 over the bi-directional wired interface 230. Specifically, the checksum error detection circuit 254 and/or the sequence number removal circuit 256 inspect each of the received first transmit data packets to identify a second subset of the first transmit data packets having corrupted bits or containing a discontinuity. A re-transmit module 258 of the second network device 240 is notified when the checksum error detection circuitry 254 detects a checksum error in one or more of the first transmit data packets received by the second network device 240 and/or the sequence number removal circuit 256 detects a packet sequence discontinuity.

The re-transmit module 258, in response to receiving the notification from the checksum error detection circuit 254 and/or the sequence number removal circuit 256, determines that the communication path is corrupted due to transient noise, and as a result the one or more second receive data packets previously transmitted over the bi-directional wired interface 230 also includes corrupted bits. Therefore, the re-transmit module 258 re-transmits the one or more second receive data packets previously transmitted over the bi-directional wired interface 230 to the first network device 200 during the estimated duration of the transient noise.

Accordingly, the first network device 200 receives re-transmitted one or more second receive data packets that were previously transmitted during the duration of the transient noise along the bi-directional wired interface 230 without requiring the higher-layer protocols to inspect the received one or more second receive data packets. Similarly, the second network device 240 receives re-transmitted one or more first transmit data packets that were previously transmitted during the duration of the transient noise along the bi-directional wired interface 230 without requiring the higher-layer protocols to inspect the one or more received first transmit data packets. In this way, Ethernet packet error detection and correction are performed in an efficient way with low latencies (as the packets are not passed to the higher-layer protocols) and with low impact to the valid data throughput.

As noted above, the methods and systems described herein rely on the duplex nature of Ethernet connection. In other words, both the first network device 200 is required to transmit the one or more first transmit data packets to the second network device 240 at the same time the second network device 240 transmits the one or more second receive data packets to the first network device 200 along the bi-directional wired interface 230.

In some implementations, the first network device 200 includes an Ethernet idle frame generator 212 for inserting idle first transmit data packets when there are no first transmit data packets to be sent to the second network device 240 along the bi-directional wired interface 230. An Ethernet frame sequence number insertion module 216 configured to insert sequence number to each of the one or more first transmit data packets. In some implementations, the Ethernet frame sequence number insertion module 216 inserts the sequence number to a preamble of each of the one or more first transmit data packets. In an embodiment, where the Ethernet frame sequence insertion module 216 inserts the sequence number in a payload of the one or more first transmit data packets, the Ethernet frame sequence insertion module 216 updates the checksum for the one or more first transmit data packets.

Similarly, the second network device 240 includes an Ethernet idle frame generator 260 for inserting idle second receive data packets when there are no second receive data packets to be sent to the first network device 200 along the bi-directional wired interface 230. An Ethernet frame sequence number insertion module 264 configured to insert sequence number to each of the one or more second receive data packets. In some implementations, the Ethernet frame sequence number insertion module 264 inserts the sequence number to a preamble of each of the one or more second receive data packets. In an embodiment, where the Ethernet frame sequence insertion module 264 inserts the sequence number in a payload of the one or more second receive data packets, the Ethernet frame sequence insertion module 264 updates the checksum for the one or more second receive data packets.

Figure 3:
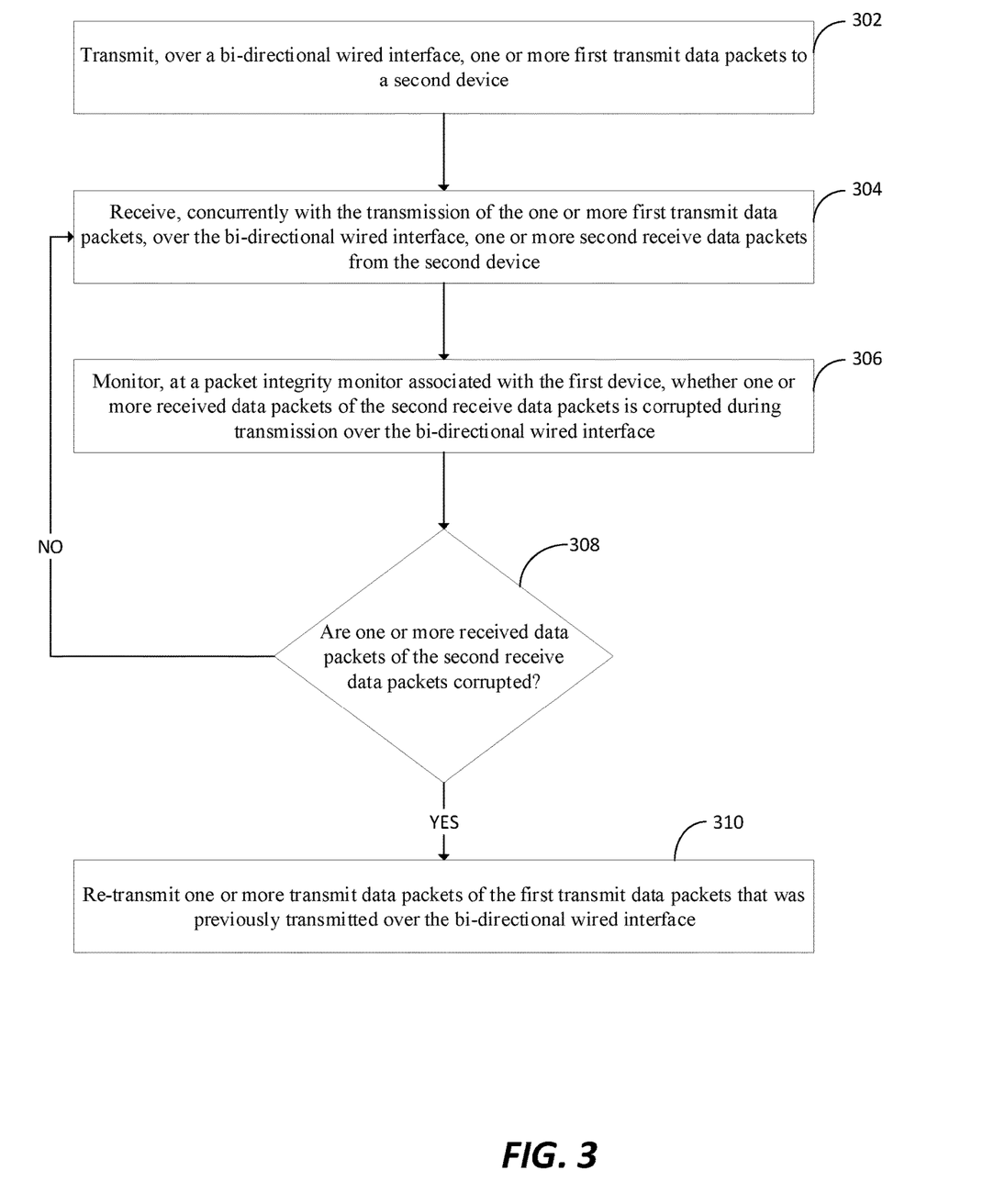
FIG. 3 is a flowchart showing a process for packet re-transmission for ethernet packet error detection and correction in an automotive environment.

FIG. 3 illustrates an example flowchart showing a process for packet re-transmission for ethernet packet error detection and correction in an automotive environment similar to the system shown in FIG. 2, according to an embodiment described herein. At 302, one or more first transmit data packets are transmitted to a second device over a bi-directional wired interface. For example, a transmitter of the first network device 200 transmits one or more first transmit data packets to the second network device 240 over the bi-directional wired interface 230.

At 304, one or more second receive data packets are received from the second device over the bi-directional wired interface concurrent with the transmission of the one or more first transmit data packets. For examples, a receiver of the first network device 200 receives one or more second receive data packets from the second network device 240 over the bi-directional wired interface 230, concurrent with the transmission of the one or more first transmit data packets.

At 306, the one or more second receive data packets are monitored to determine whether one or more received data packets of the second receive data packets are corrupted. For example, a packet integrity monitor 205 of the first network device 200 monitors the one or more second receive data packets to determine whether one or more received data packets of the second receive data packets are corrupted.

At 308, a determination is made about whether one or more received data packets of the second receive data packets are corrupted. If one or more received data packets of the second receive data packets is determined to contain corrupted bits at step 308, the method proceeds to step 310 and one or more first transmit data packets which were previously transmitted are re-transmitted to the second device. For example, the packet integrity monitor, in response to determining that one or more received data packets of the second receive data packets contains corrupted bits, instructs the re-transmit module 210 to re-transmit one or more first transit data packets that were previously transmitted to the second network device 240 via the bi-directional wired interface 230.

Various embodiments discussed in conjunction with FIGS. 1-3 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., 200, 240 in FIG. 2), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 3 does not necessarily require the particular order shown, or sequential order, to achieve desirable results. In certain implementations, multitasking and parallel processing may be advantageous. Other variations are within the scope of the following claims.

What is claimed is:

1. A network device for packet re-transmission via a bi-directional wired interface between two devices, the network device comprising:
    a transmitter configured to transmit, over the bi-directional wired interface, one or more first transmit data packets to a second device;
    a receiver configured to receive, concurrently with the transmission of the one or more first transmit data packets, over the bi-directional wired interface, one or more second received data packets from the second device;
    a packet integrity monitor configured to detect whether one or more concurrently received data packets of the second received data packets is corrupted; and
    a processing circuitry configured to, in response to detecting that one or more concurrently received data packets of the second received data packets is corrupted, cause the transmitter to re-transmit one or more transmit data packets of the first transmit data packets that was previously transmitted over the bi-directional wired interface.

2. The network device of claim 1, wherein the packet integrity monitor is disposed to detect whether the one or more received data packets is corrupted at a physical layer of the network device, without engaging a higher network layer to detect whether the one or more received data packets is corrupted.

3. The network device of claim 2, wherein the packet integrity monitor, when detecting whether one or more received data packets of the second received data packets is corrupted, is configured to:
    inspect the second received data packets received at the receiver to detect whether one or more received data packets of the second received data packets has corrupted bits; and
    in response to detecting that one or more receive data packets of the second received data packets has corrupted bits, cause the transmitter of the network device to re-transmit one or more transmit data packets of the first transmit data packets that was previously transmitted over the bi-directional wired interface.

4. The network device of claim 3, wherein the packet integrity monitor, when inspecting the second received data packets received at the receiver to detect whether one or more received data packets of the second received data packets has corrupted bits, is configured to:
    calculate a checksum of received packets among the second received data packets received at the receiver; and
    in response to detecting a checksum error in one or more received data packets of the second received data packets, notify the processing circuitry that the one or more received data packets of the second received data packets has corrupted bits.

5. The network device of claim 3, wherein the processing circuitry is further configured to:
    in response to detecting that one or more received data packets of the second received data packets has corrupted bits, determine that transient noise exists along the bi-directional wired interface.

6. The network device of claim 5, wherein the processing circuitry is further configured to:
    estimate a duration of the transient noise existing along the bi-directional wired interface;
    determine a subset of the first transmit data packets previously transmitted affected by the transient noise; and
    re-transmit, over the bi-directional wired interface, the determined previously transmitted subset of the first transmit data packets to the second device.

7. The network device of claim 3, wherein the packet integrity monitor, when inspecting the second received data packets to detect whether one or more received data packets of the second received data packets has corrupted bits, is configured to:
    monitor a sequence number associated with respective ones of the one or more second received data packets; and
    in response to determining that the one or more second received data packets include a discontinuity, notify the processing circuitry that one or more received data packets of the second received data packets have been dropped.

8. The network device of claim 1, wherein the processing circuitry is configured to:
receive a notification from the packet integrity monitor indicative of one or more second received data packets received over the bi-directional wired interface having corrupted bits;
in response to receiving the notification from the packet integrity monitor, simultaneously re-transmit one or more first transmit data packets over the bi-directional wired interface.

9. The network device of claim 1 further comprising:
an ethernet idle frame generator configured to generate one or more idle data packets to be transmitted as the one or more first transmit data packets over the bi-directional wired interface.

10. The network device of claim 9 further comprising:
an ethernet frame sequence number insertion module configured to insert a sequence number to a preamble of each of the one or more first transmit data packets.

11. The network device of claim 1, wherein the processing circuit is further configured to:
re-transmit one or more first transmit data packets that was previously transmitted over the bi-directional wired interface, without having received a notification from the second device indicating that one or more of the first transmit packets is corrupted.

12. The network device of claim 1 further comprising:
a memory having a read pointer, configured to store selected ones of the transmitted one or more first transmit data packets, wherein the processing circuitry is configured to, in response to detecting that one or more concurrently received data packets of the second received data packets is corrupted or is received in a discontinued sequence, cause the transmitter to re-transmit over the bi-directional wired interface one or more selected previously transmitted data packets from among the first transmit data packets, stored in the memory, and reset the read pointer.

13. A method for packet re-transmission via a bi-directional wired interface between two devices, the method comprising:
transmitting, over the bi-directional wired interface, one or more first transmit data packets from a first device to a second device;
receiving at the first device, concurrently with the transmission of the one or more first transmit data packets, over the bi-directional wired interface, one or more second received data packets from the second device;
monitoring, at a packet integrity monitor associated with the first device, whether one or more concurrently received data packets of the second received data packets is corrupted; and
in response to detecting that one or more concurrently received data packets of the second received data packets is corrupted, re-transmitting from the first device one or more transmit data packets of the first transmit data packets that was previously transmitted over the bi-directional wired interface.

14. The method of claim 13, wherein the packet integrity monitor at the first device is disposed to detect whether the one or more received data packets is corrupted at a physical layer of the first device, without engaging a higher network layer to detect whether the one or more received data packets is corrupted.

15. The method of claim 14, wherein detecting whether one or more received data packets of the second received data packets is corrupted comprises:
inspecting the second received data packets to detect whether one or more received data packets of the second received data packets has corrupted bits; and
in response to detecting that one or more received data packets of the second received data packets has corrupted bits, re-transmitting one or more transmit data packets of the first transmit data packets that was previously transmitted over the bi-directional wired interface.

16. The method of claim 15, wherein inspecting the second received data packets received at the receiver at the first device to detect whether one or more received data packets of the second received data packets has corrupted bits comprises:
calculating a checksum of respective data packets among the second received data packets received at the receiver at the first device; and
in response to detecting a checksum error in one or more received data packets of the second received data packets, determining that the one or more received data packets of the second received data packets has corrupted bits.

17. The method of claim 15, further comprising:
in response to detecting that one or more received data packets of the second received data packets has corrupted bits, determining the existence of transient noise along the bi-directional wired interface.

18. The method of claim 17, further comprising:
estimating a duration of the transient noise existing along the bi-directional wired interface;
determining a subset of the first transmit data packets previously transmitted affected by the transient noise; and
re-transmitting, over the bi-directional wired interface, the determined previously transmitted subset of the first transmit data packets to the second device.

19. The method of claim 15, wherein inspecting the second received data packets to detect whether one or more received data packets of the second received data packets has corrupted bits comprises:
monitoring a sequence number associated with respective ones of the one or more second received data packets; and
in response to determining that the one or more second received data packets include a discontinuity, determining that one or more received data packets of the second received data packets have been dropped.

20. The method of claim 13, further comprising:
determining that one or more second received data packets received over the bi-directional wired interface have corrupted bits;
in response to making the determination, simultaneously re-transmitting one or more first transmit data packets over the bi-directional wired interface.

21. The method of claim 13 further comprising:
generating one or more idle data packets to be transmitted as the one or more first transmit data packets over the bi-directional wired interface.

22. The method of claim 21 further comprising:
inserting a sequence number to a preamble of each of the one or more first transmit data packets.

23. The method of claim 13, further comprising:
re-transmitting one or more first transmit data packets that was previously transmitted over the bi-directional wired interface, without having received a notification from the second device indicating that one or more of the first transmit packets is corrupted.

24. The method of claim 13 further comprising:
storing, in a memory having a read pointer, selected ones of the transmitted one or more first transmit data packets, wherein in response to detecting that one or more concurrently received data packets of the second received data packets is corrupted or is received in a discontinued sequence, re-transmitting over the bi-directional wired interface one or more selected previously transmitted data packets from among the first transmit data packets, stored in the memory, and resetting the read pointer.

\* \* \* \* \*